United States Patent
Zhang et al.

(10) Patent No.: US 10,687,077 B2
(45) Date of Patent: Jun. 16, 2020

(54) MOTION INFORMATION PROPAGATION IN VIDEO CODING

(71) Applicant: QUALCOMM Incorporated, San Diego, CA (US)

(72) Inventors: Kai Zhang, San Diego, CA (US); Xiang Li, San Diego, CA (US); Jianle Chen, San Diego, CA (US); Li Zhang, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/011,340

(22) Filed: Jun. 18, 2018

(65) Prior Publication Data

US 2018/0376164 A1    Dec. 27, 2018

Related U.S. Application Data

(60) Provisional application No. 62/525,075, filed on Jun. 26, 2017.

(51) Int. Cl.
*H04N 19/56* (2014.01)
*H04N 19/176* (2014.01)
(Continued)

(52) U.S. Cl.
CPC .......... *H04N 19/56* (2014.11); *H04N 19/109* (2014.11); *H04N 19/159* (2014.11);
(Continued)

(58) Field of Classification Search
CPC .. H04N 19/109; H04N 19/159; H04N 19/172; H04N 19/176; H04N 19/196; H04N 19/52; H04N 19/56
See application file for complete search history.

(56) References Cited

U.S. PATENT DOCUMENTS

2012/0269270 A1*  10/2012  Chen ............... H04N 19/597
                                                375/240.16
2018/0249156 A1*   8/2018  Heo ................. H04N 19/70

FOREIGN PATENT DOCUMENTS

WO    2008093936 A1    8/2008
WO    2012119777 A1    9/2012

OTHER PUBLICATIONS

International Search Report and Written Opinion—PCT/US2018/038804—ISA/EPO—dated Sep. 13, 2018.
(Continued)

*Primary Examiner* — Farzana Hossain
(74) *Attorney, Agent, or Firm* — Qualcomm Incorporated

(57) ABSTRACT

Techniques are directed to a device for decoding a current block of video data in a current coding picture. The device may include a memory configured to store video data. The device may also include a processor configured to generate a first prediction block for the current block of the video data in the current picture according to an intra-prediction mode and generate a second prediction block for the current block of the video data in the current picture the picture according to an inter-prediction mode. The processor may be configured to generate motion information propagated from the second prediction block of the picture to the first prediction block, and use the motion information to obtain a final prediction block, then generate a reconstructed block based on a combination of the final prediction block and a residual block.

28 Claims, 13 Drawing Sheets

(51) Int. Cl.
*H04N 19/52* (2014.01)
*H04N 19/196* (2014.01)
*H04N 19/159* (2014.01)
*H04N 19/109* (2014.01)
*H04N 19/172* (2014.01)

(52) U.S. Cl.
CPC ......... *H04N 19/176* (2014.11); *H04N 19/196* (2014.11); *H04N 19/52* (2014.11); *H04N 19/172* (2014.11)

(56) References Cited

OTHER PUBLICATIONS

Liu D., et al., "An Improved Motion Vector Prediction Scheme for Video Coding", Advances in Multimedia Information Processing—PCM 2006, 7th Pacific Rim Conference on Multimedia, Proceedings Nov. 2-4, 2006 Hangzhou, China, Nov. 2, 2006 (Nov. 2, 2006), pp. 598-605, XP002548080, 8 pages, Retrieved from the Internet: URL: http://www.idl.ac.cn/doc/2006/An%20Improved%20Motion%20Vector%20Prediction%20Scheme%20for%20Video%20 . . . , [retrieved on Sep. 30, 2009].

Park S., et al., "Modifications of Temporal MV Compression and Temporal MV Predictor", 5. JCT-VC Meeting; 96. MPEG Meeting; Mar. 16, 2011-Mar. 23, 2011; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-E059, Mar. 10, 2011 (Mar. 10, 2011), XP030008565, 8 pages.

\* cited by examiner

Intra-Slice

Inter-Slice

MOTION INFORMATION PROPAGATION IN VIDEO CODING

INCORPORATION BY REFERENCE TO PRIORITY APPLICATION

This application claims benefit under 35 U.S.C. § 119(e) from U.S. Provisional Patent Application Ser. No. 62/525,075 entitled MOTION INFORMATION PROPAGATION IN VIDEO CODING, and filed Jun. 26, 2017.

TECHNICAL FIELD

This disclosure relates to video encoding and video decoding.

BACKGROUND

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. The latest joint draft of MVC is described in "Advanced video coding for generic audiovisual services," ITU-T Recommendation H.264, March 2010.

In addition, there is a newly developed video coding standard, namely High Efficiency Video Coding (HEVC), developed by the Joint Collaboration Team on Video Coding (JCT-VC) of ITU-T Video Coding Experts Group (VCEG) and ISO/IEC Motion Picture Experts Group (MPEG). A recent draft of HEVC is available from http://phenix.int-evry.fr/jct/doc_end_user/documents/12_Geneva/wg11/JCTVC-L1003-v34.zip Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the recently finalized High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques related to improvements to advanced motion vector prediction. The techniques of this disclosure may be applied to future video coding standards. In one example, the techniques are directed to a device for decoding a current block of video data in a current coding picture. The device may include a memory configured to store video data. The device may also include a processor configured to generate a first prediction block for the current block of the video data in the current picture according to an intra-prediction mode and generate a second prediction block for the current block of the video data in the current picture the picture according to an inter-prediction mode. The processor may be configured to generate motion information propagated from the second prediction block of the picture to the first prediction block, and use the motion information to obtain a final prediction block, then generate a reconstructed block based on a combination of the final prediction block and a residual block.

In another example, the techniques are directed to a method for processing video data, including generating a first prediction block for a block of a picture according to an intra-prediction mode, generating a second prediction block for the block of the picture according to an inter-prediction mode, and propagating motion information to the first prediction block based upon motion information from the second prediction block. The techniques include generating a final prediction block for the block of the picture based on a combination of the first and second prediction blocks.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

This disclosure describes techniques related to a filtering method which could be used in a post-processing stage, as part of in-loop coding, or in the prediction stage. The techniques of this disclosure may be implemented into existing video codecs, such as HEVC (High Efficiency Video Coding), or be an efficient coding tool for a future video coding standard, such as the H.266 standard presently under development.

Basics of Video Coding

Figure 1A:
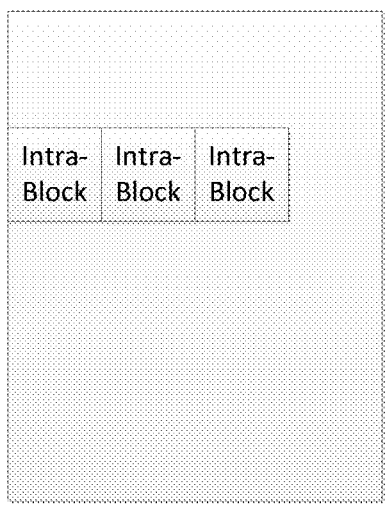
FIG. 1A and FIG. 1B show examples of an intra-frame and an inter-frame.
Figure 1B:
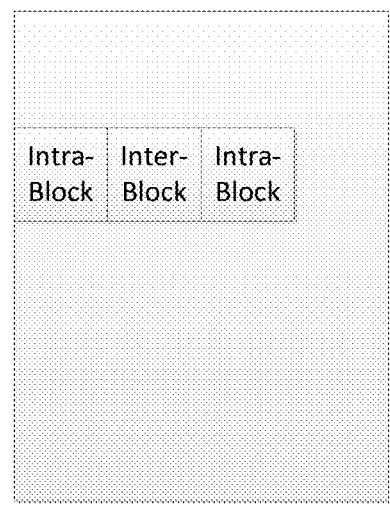

With reference to FIG. 1A and FIG. 1B and in video coding standards such as HEVC, there are two kinds of frames (or slices, into which frames are divided for coding): namely inter-frames and intra-frames. In an intra-frame, a block can only be coded as an intra-block. See G. J. Sullivan; J.-R. Ohm; W.-J. Han; T. Wiegand (December 2012). "Overview of the High Efficiency Video Coding (HEVC) Standard" (PDF). IEEE Transactions on Circuits and Systems for Video Technology (IEEE) 22 (12). Retrieved 2012 Sep. 14 (Hereinafter "[1]"). While in an inter-frame, a block can be coded as an intra-block or an inter-block. FIG. 1A and FIG. 1B show examples of an intra-frame and an inter-frame. The term "blocks" used here can be coding unit/block, prediction unit/block, sub-PU, transform unit/block or any other coding structures. The term "frame" is used herein interchangeably with "picture."

Figure 2:
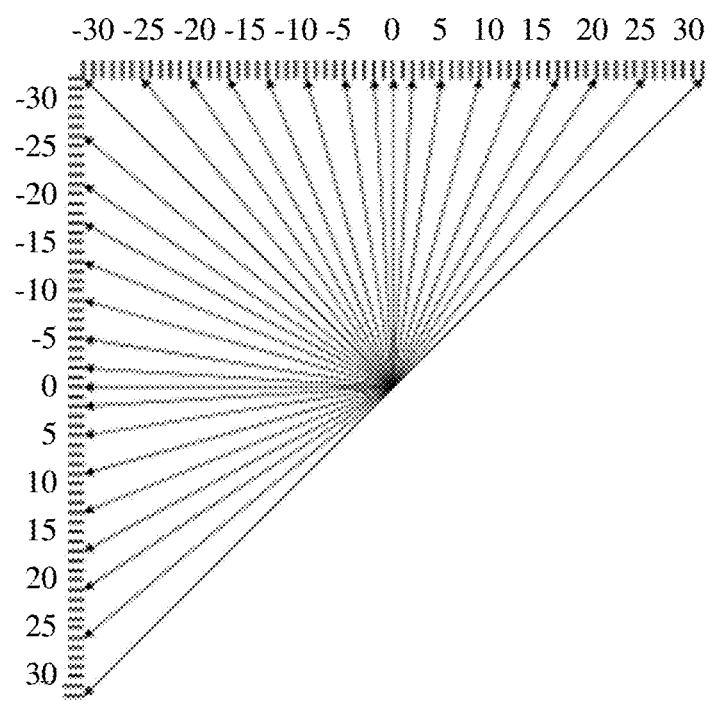
FIG. 2 shows intra-prediction modes representing different prediction directions in HEVC.

With reference to FIG. 2, a block coded as an intra-block is predicted using intra-prediction, in which the current block is predicted from neighboring pixels in the current frame (e.g., pixels in neighboring blocks). A block coded as an inter-block applies inter-prediction, with which the current block is predicted by pixels in previously coded/ decoded frames, named "reference frames". In HEVC, there are 35 intra-prediction modes representing different prediction directions as shown in FIG. 2. In JEM, the number of intra-prediction modes is increased to 67. See J. Chen, E. Alshina, G. J. Sullivan, J.-R. Ohm, J. Boyce, JVET-F1001, "Algorithm Description of Joint Exploration Test Model 6," April 2017 (Hereinafter "[2]").

Figure 3:
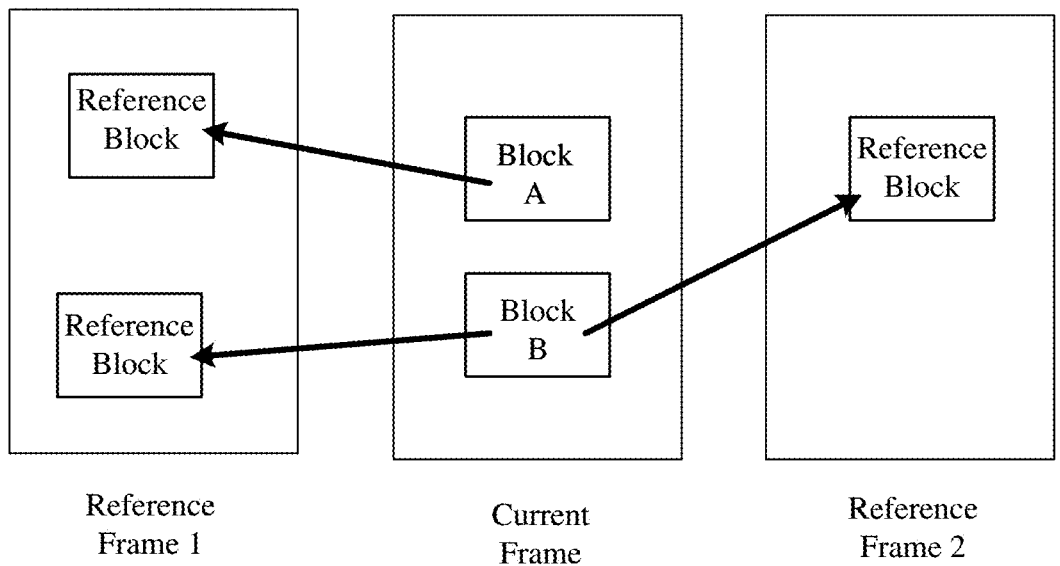
FIG. 3 shows reference frames using uni-prediction and bi-prediction.

With reference to FIG. 3, each intra-coded block has its intra-prediction mode information. For inter-prediction, motion compensation (MC) is used from one reference block (uni-prediction) or two reference blocks (bi-prediction) in reference frames as shown in FIG. 3. Each inter-coded block has its motion information, including reference frame indices and motion vectors (MV).

Figure 4:
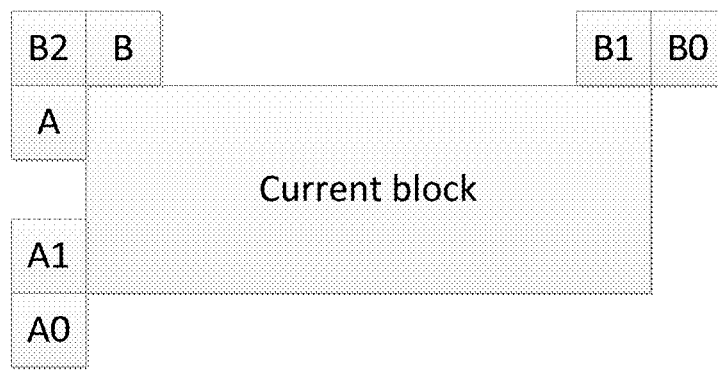
FIG. 4 shows exemplary neighboring blocks of a current block.

With reference to FIG. 4, to code an intra-prediction mode, intra-prediction modes of the neighboring blocks are used as prediction modes for the current mode. FIG. 4 shows exemplary neighboring blocks. In HEVC, intra-prediction modes of neighboring block A and B are used as prediction modes for the intra mode of the current block. In JEM, more neighboring blocks (A0, A1, B0, B1, B2) are used as prediction modes for the current mode. If a neighboring block does not exist (the current block is at the boundary of a frame), or a neighboring block is not intra-coded (the current frame is an inter-frame but the current block is intra-coded), the neighboring block is marked as "unavailable" and its intra-prediction mode is not used to predict the intra-prediction mode of the current block.

After prediction, on an encoder, a residual, the difference between the block and the prediction is generated and encoded, typically using a frequency transform. On a decoder, after prediction, residual data in the bitstream may be used to reconstruct a residual, which is then combined with the decoder prediction to generate a decoded block.

Motion Information

For each block, a set of motion information can be available. The set of motion information contains motion information for forward and backward prediction directions. Here forward and backward prediction directions are two prediction directions corresponding to reference picture list 0 (RefPicList0) and reference picture list 1 (RefPicList1) of a current picture or slice. The terms "forward" and "backward" do not necessarily have a geometry meaning. Instead, they are used to distinguish which reference picture list a motion vector is based on. Forward prediction means the prediction formed based on reference list 0, while backward prediction means the prediction formed based on reference list 1. In case both reference list 0 and reference list 1 are used to form a prediction for a given block, it is called bi-directional prediction.

For a given picture or slice, if only one reference picture list is used, every block inside the picture or slice is forward predicted. If both reference picture lists are used for a given picture or slice, a block inside the picture or slice may be forward predicted, or backward predicted, or bi-directionally predicted.

For each prediction direction, the motion information contains a reference index and a motion vector. A reference index is used to identify a reference picture in the corresponding reference picture list (e.g. RefPicList0 or RefPicList1). A motion vector has both a horizontal and a vertical component, with each indicating an offset value along horizontal and vertical direction respectively. In some descriptions, for simplicity, the word of "motion vector" may be used interchangeably with motion information, to indicate both the motion vector and its associated reference index.

POC

Picture order count (POC) is widely used in video coding standards to identify a display order of a picture. Although there are cases two pictures within one coded video sequence may have the same POC value, it typically does not happen within a coded video sequence. When multiple coded video sequences are present in a bitstream, pictures with a same value of POC may be closer to each other in terms of decoding order.

POC values of pictures are typically used for reference picture list construction, derivation of reference picture set as in HEVC and motion vector scaling. It is noted that decoding order in a bitstream may be different from the display order for the sequence.

Advanced Video Coding (AVC)

MB Structure in AVC

In H.264/AVC, each inter macroblock (MB) may be partitioned into four different ways: (a) One 16×16 MB partition; (b) Two 16×8 MB partitions; (c) Two 8×16 MB partitions; and (d) Four 8×8 MB partitions.

Different MB partitions in one MB may have different reference index values for each direction (RefPicList0 or RefPicList1). When an MB is not partitioned into four 8×8 MB partitions, it has only one motion vector for each MB partition in each direction. When an MB is partitioned into four 8×8 MB partitions, each 8×8 MB partition can be further partitioned into sub-blocks, each of which can have a different motion vector in each direction. There are four different ways to get sub-blocks from an 8×8 MB partition: (a) One 8×8 sub-block; (b) Two 8×4 sub-blocks; (c) Two 4×8 sub-blocks; and (d) Four 4×4 sub-blocks. Each sub-block can have a different motion vector in each direction. Therefore, motion vector is present in a level equal to higher than sub-block.

Temporal Direct Mode in AVC

In AVC, temporal direct mode could be enabled in either MB or MB partition level for skip or direct mode in B slices. For each MB partition, the motion vectors of the block co-located with the current MB partition in the RefPicList1 [0] of the current block are used to derive the motion vectors. Each motion vector in the co-located block is scaled based on POC distances.

Spatial Direct Mode in AVC

In AVC, a direct mode can also predict motion information from the spatial neighbors.

HEVC

Coding Structure in HEVC

In HEVC, the largest coding unit in a slice is called a coding tree block (CTB) or coding tree unit (CTU). A CTB contains a quad-tree the nodes of which are coding units.

The size of a CTB can be ranges from 16×16 to 64×64 in the HEVC main profile (although technically 8×8 CTB sizes can be supported). A coding unit (CU) could be the same size of a CTB although and as small as 8×8. Each coding unit is coded with one mode. When a CU is inter coded, it may be further partitioned into 2 or 4 prediction units (PUs) or become just one PU when further partition doesn't apply. When two PUs are present in one CU, they can be half size rectangles or two rectangle size with ¼ or ¾ size of the CU.

When the CU is inter coded, one set of motion information is present for each PU. In addition, each PU is coded with a unique inter-prediction mode to derive the set of motion information. Each unit comprises blocks for each of one or more luma or color components.

Motion Vector Prediction

In HEVC standard, there are two inter prediction modes, named merge (skip is considered as a special case of merge) and advanced motion vector prediction (AMVP) modes respectively for a prediction unit (PU). In either AMVP or merge mode, a motion vector (MV) candidate list is maintained for multiple motion vector predictors. The motion vector(s), as well as reference indices in the merge mode, of the current PU are generated by taking one candidate from the MV candidate list.

The MV candidate list contains up to 5 candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode for each potential prediction direction from either list 0 or list 1, a reference index needs to be explicitly signaled, together with an MVP index to the MV candidate list since the AMVP candidate contains only a motion vector. In AMVP mode, the predicted motion vectors can be further refined. can be seen above, a merge candidate corresponds to a full set of motion information while an AMVP candidate contains just one motion vector for a specific prediction direction and reference index.

The candidates for both modes are derived similarly from the same spatial and temporal neighboring blocks.

Spatial Neighboring Candidates

Figure 5A:
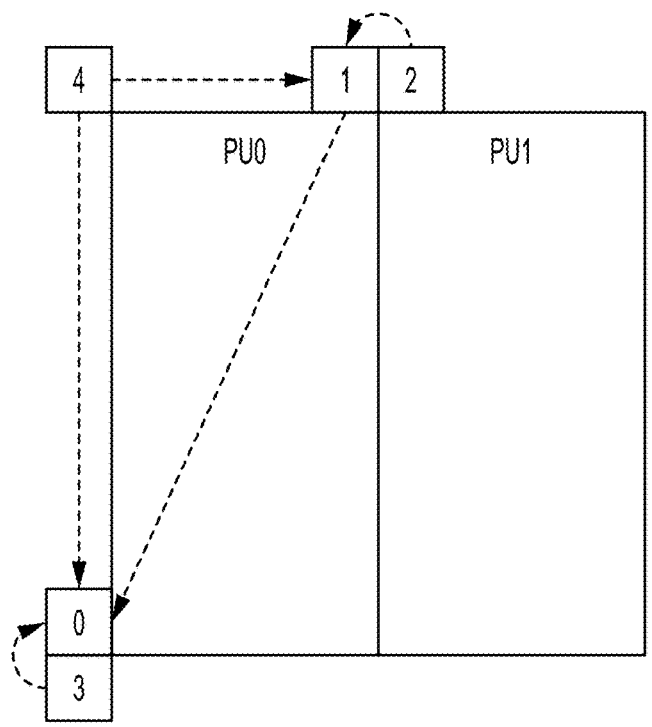
FIG. 5A and FIG. 5B illustrate spatial neighboring MV candidates for merge mode (FIG. 5A) and AMVP mode (FIG. 5B).
Figure 5B:
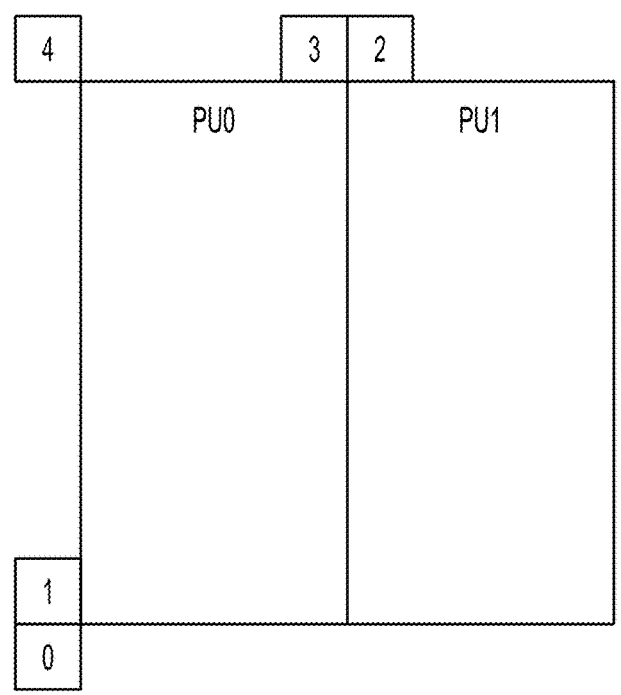

FIG. 5A and FIG. 5B illustrate spatial neighboring MV candidates for merge mode (FIG. 5A) and AMVP mode (FIG. 5B).

With reference to FIG. 5A and FIG. 5B, spatial MV candidates are derived from the neighboring blocks shown for a specific PU (PU$_0$), although the methods generating the candidates from the blocks differ for merge and AMVP modes.

In merge mode, up to four spatial MV candidates can be derived with the orders showed on FIG. 5A with numbers, and the order is the following: left (0, A1), above (1, B1), above right (2, B0), below left (3, A0), and above left (4, B2). Said differently, FIG. 5A illustrates spatial neighboring MV candidates for merge mode, while FIG. 5B illustrates spatial neighboring MV candidates for AMVP mode.

In AVMP mode, as illustrated in FIG. 5B, the neighboring blocks are divided into two groups: left group consisting of the block 0 and 1, and above group consisting of the blocks 2, 3, and 4 as shown on FIG. 5B. For each group, the potential candidate in a neighboring block referring to the same reference picture as that indicated by the signaled reference index has the highest priority to be chosen to form a final candidate of the group. It is possible that all neighboring blocks don't contain a motion vector pointing to the same reference picture. Therefore, if such a candidate cannot be found, the first available candidate will be scaled to form the final candidate, thus the temporal distance differences can be compensated.

Temporal Motion Vector Prediction in HEVC

Temporal motion vector predictor (TMVP) candidate, if enabled and available, is added into the MV candidate list after spatial motion vector candidates. The process of motion vector derivation for TMVP candidate is the same for both merge and AMVP modes, however the target reference index for the TMVP candidate in the merge mode is always set to 0.

Figure 6A:
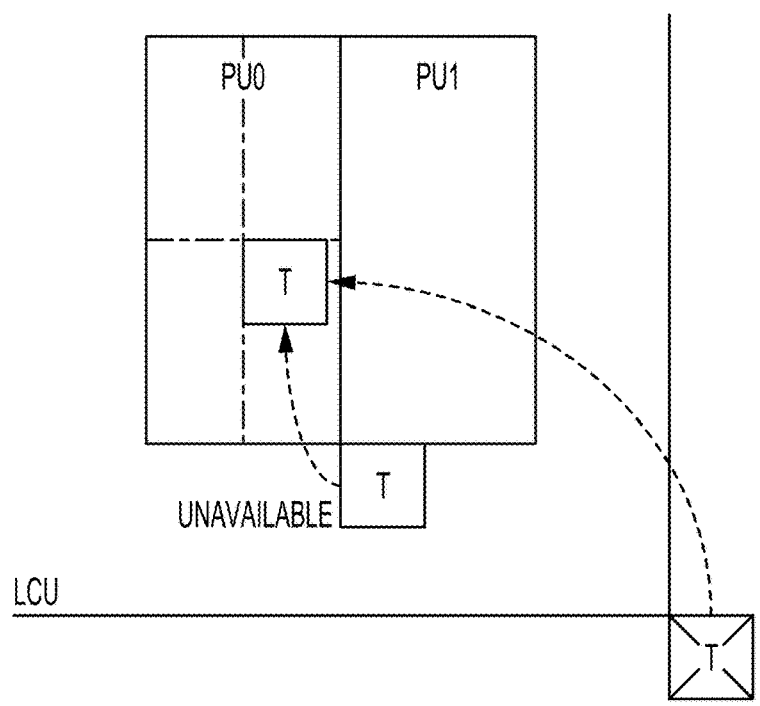
FIG. 6A illustrates a TMVP candidate and FIG. 6B illustrates MV scaling.
Figure 6B:
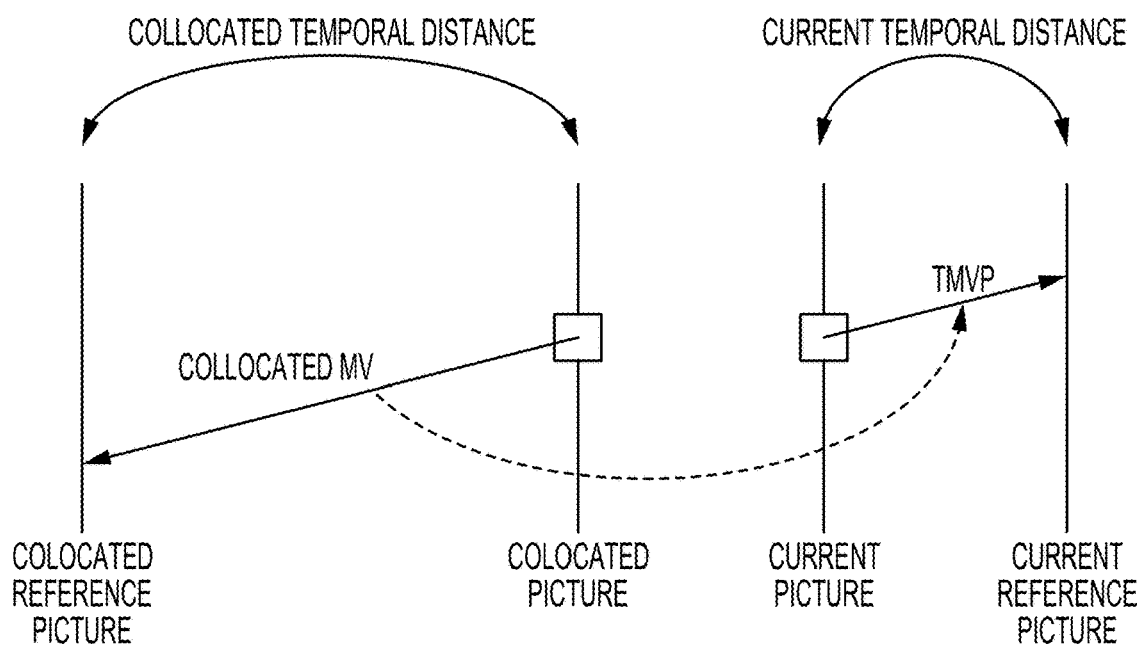

FIG. 6A illustrates a TMVP candidate and FIG. 6B illustrates MV scaling.

With reference to FIG. 6A, the primary block location for TMVP candidate derivation is the bottom right block outside of the collocated PU as shown as a block "T", to compensate the bias to the above and left blocks used to generate spatial neighboring candidates. However, if that block is located outside of the current CTB row or motion information is not available, the block is substituted with a center block of the PU.

Motion vector for TMVP candidate is derived from the co-located PU of the co-located picture, indicated in the slice level. The motion vector for the co-located PU is called collocated MV.

Similar to temporal direct mode in AVC, to derive the TMVP candidate motion vector, the co-located MV need to be scaled to compensate the temporal distance differences, as shown in FIG. 6A and FIG. 6B.

Other Aspects of Motion Prediction in HEVC

Several aspects of merge and AMVP modes are worth mentioning as follows. Motion vector scaling: It is assumed that the value of motion vectors is proportional to the distance of pictures in the presentation time. A motion vector associates two pictures, the reference picture, and the picture containing the motion vector (namely the containing picture). When a motion vector is utilized to predict the other motion vector, the distance of the containing picture and the reference picture is calculated based on the Picture Order Count (POC) values.

For a motion vector to be predicted, both its associated containing picture and reference picture may be different. Therefore, a new distance (based on POC) is calculated. And the motion vector is scaled based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

Artificial motion vector candidate generation: If a motion vector candidate list is not complete, artificial motion vector candidates are generated and inserted at the end of the list until it will have all candidates.

In merge mode, there are two types of artificial MV candidates: combined Bi-prediction candidate derived only for B-slices and default fixed candidates. Only zero candidate is used for AMVP if the first type doesn't provide enough artificial candidates.

For each pair of candidates that are already in the candidate list and have necessary motion information, bi-directional combined motion vector candidates are derived by a combination of the motion vector of the first candidate referring to a picture in the list 0 and the motion vector of a second candidate referring to a picture in the list 1.

Pruning process for candidate insertion: Candidates from different blocks may happen to be the same, which decreases the efficiency of a merge/AMVP candidate list. A pruning process is applied to solve this problem. It compares one candidate against the others in the current candidate list to avoid inserting identical candidate in certain extent. To reduce the complexity, only limited numbers of pruning process is applied instead of comparing each potential one with all the other existing ones.

Figure 7:
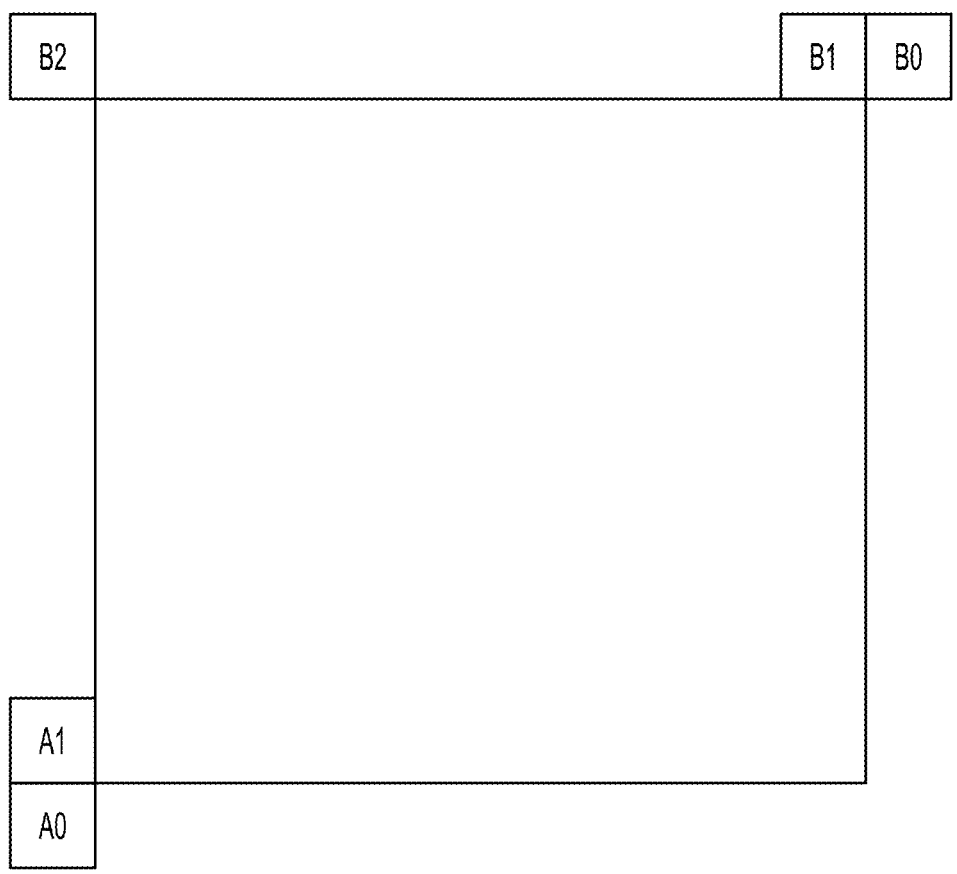
FIG. 7 is an example of a candidate list based on a predefined order (or per a predefined priority).

As described above, there are many priority-based candidate lists. Each candidate is inserted into the candidate list per a predefined priority. For example, in HEVC, Merge candidate list, AMVP candidate list are constructed by inserting candidates based on a predefined order (or per a predefined priority). As shown in FIG. 7, the merge candidate list is constructed by inserting the spatial merging candidate by a predefined order (A1→B1→B0→A0→B2).

Figure 8:
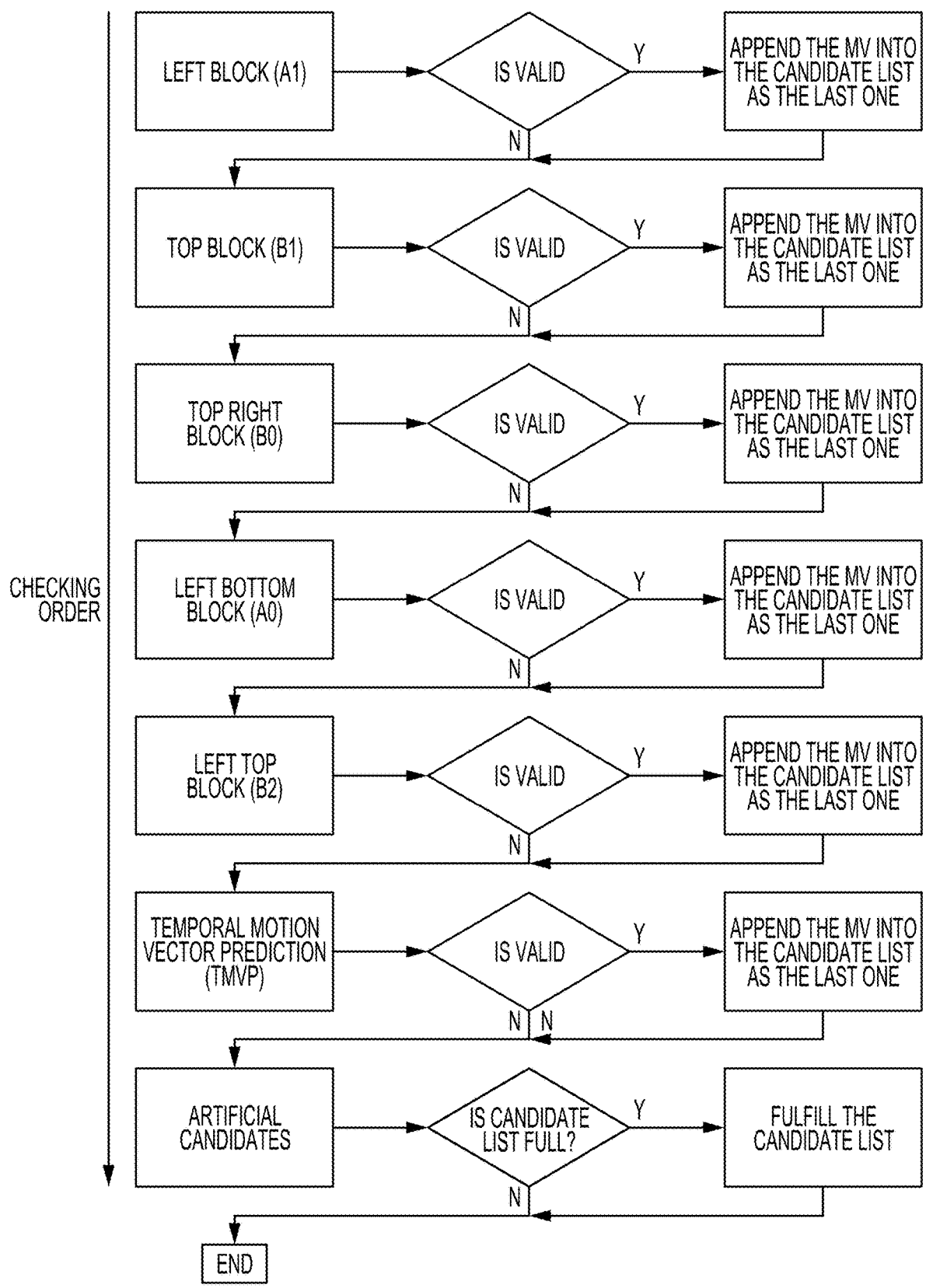
FIG. 8 illustrates an example of construction of a merge candidate list in HEVC.

FIG. 8 illustrates an example of construction of a merge candidate list in HEVC. As illustrated in FIG. 8 for the construction process, each spatial or temporal neighboring blocks are checked one by one to identify whether the block can provide a valid merge candidate. The term "valid" means the block exists, is inter-coded, the candidate list is not full, and the motion information in the block is not pruned by existing candidates in the current candidate list. It should be noted that one candidate may be only pruned to partial of existing candidates in the current candidate list. For B2, it is only checked if there are less than 4 candidates after checking A1, B1, B0 and A0. If the merge candidate list is not full after checking all spatial and temporal neighboring blocks, the artificial candidates will be stuffed to fulfill the merge candidate list. The term "blocks" (e.g. Block0-Block4 and the Current Block) used here can be coding unit/block, prediction unit/block, sub-PU, transform unit/block or any other coding structures.

Improving Coding Effiency

To improve efficiency of prediction, embodiments include propagation of motion information to intra-coded blocks in an inter-picture. In other words, the intra-coded blocks themselves can be used for motion vector prediction. For example, intra-coded blocks can be used in the construction of candidate lists such as merging candidate list and AMVP list for a lately coded block. According to an embodiment, the following exemplary methods may be applied individually. According to alternative embodiments, any combination of the exemplary methods may be applied.

Figure 9:
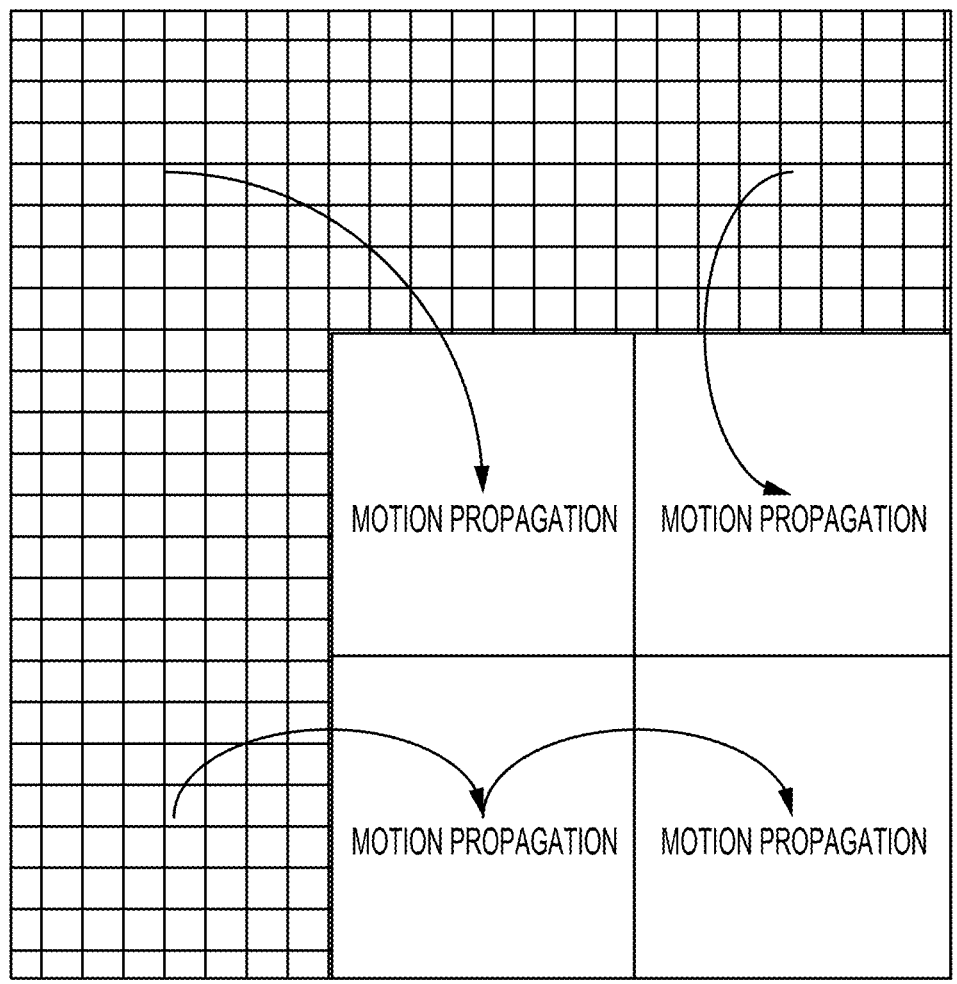
FIG. 9 shows examples of motion propagation between an inter-coded block and an intra-coded block; and examples of motion propagation between an intra-coded block and an inter-coded block.

FIG. 9 illustrates examples of motion propagation between an inter-coded block and an intra-coded block; and examples of motion propagation between an intra-coded block and an inter-coded block.

An intra-coded block inherits motion information from spatially and/or temporally neighboring blocks, wherein the neighboring blocks can be intra-coded and/or inter-coded. FIG. 9 shows examples of motion propagation between an inter-coded block and an intra-coded block; and examples of motion propagation between an intra-coded block and an inter-coded block.

In one example, the neighboring blocks are those within the same slice/tile/LCU row/picture.

Alternatively, the neighboring blocks may be those located in one or more previously coded frames.

An intra-coded block may inherit motion information from one neighboring block and the relative position of the neighboring block may be pre-defined.

Alternatively, relative positions of more than one neighboring blocks may be pre-defined. A rule may be further defined to select one from the multiple neighboring blocks and the intra-coded block will inherit Motion information from the selected one neighboring block.

According to an example, each block will be filled with Motion information after being encoded/decoded, no matter if it is intra-coded or inter-coded.

According to an example, an intra-coded block inherits Motion information from neighboring blocks and the selection of the neighboring block, where the motion information of the current intra-coded block inherits from, is based on the coding modes of the neighboring blocks.

According to an example, a priority-based method may be defined to select motion information from neighboring blocks. When an intra-coded block chooses to inherit the motion information from which neighboring block, an inter-coded neighboring block has a higher priority than an intra-coded neighboring block.

According to an example, an intra-coded block inherits motion information from neighboring blocks based on the intra-prediction mode of a neighboring block if the neighboring block is intra coded.

According to an example, an intra-coded block inherits motion information from neighboring blocks based on the motion information of neighboring blocks. An embodiment is when an intra-coded block chooses to inherit the motion information from which neighboring block, a neighboring block with bi-prediction has a higher priority than a neighboring block with uni-prediction.

Figure 10:
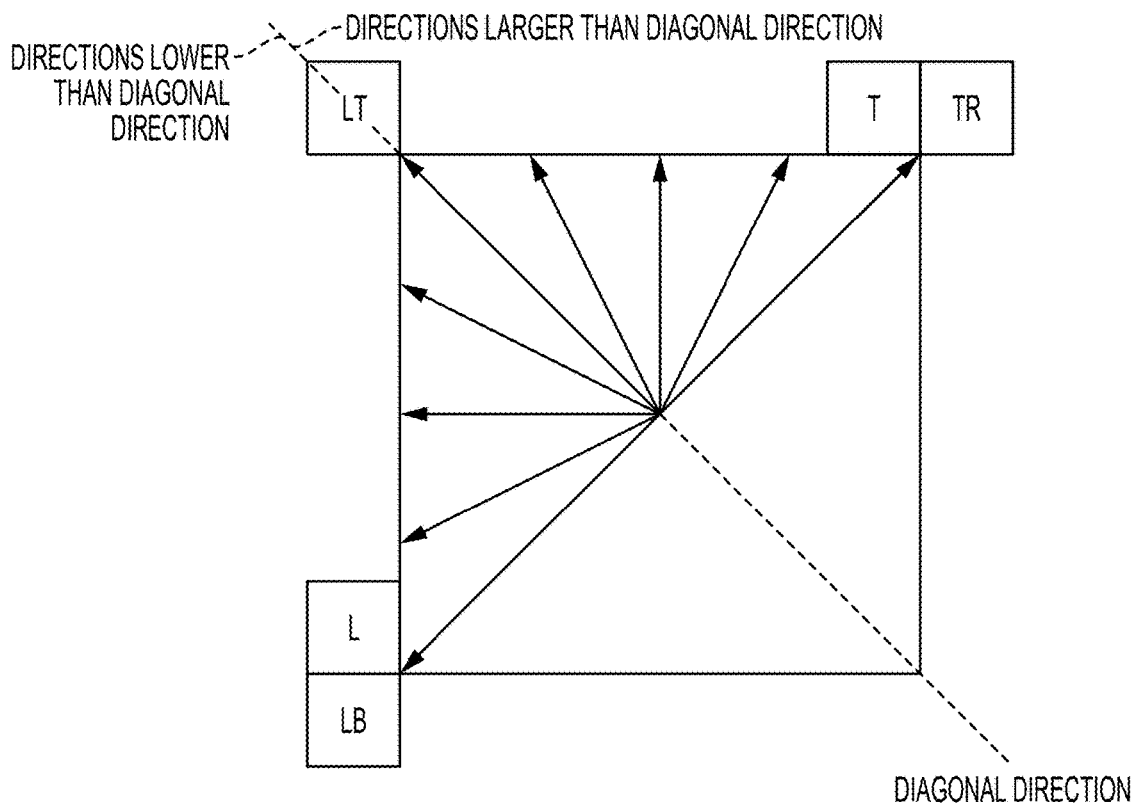
FIG. 10 shows an example of how to inherit motion information based on the intra-prediction mode of the current block.

FIG. 10 illustrates an example of inheriting motion information based on an intra-prediction mode. In the example of FIG. 10, an intra-coded block inherits motion information from neighboring blocks based on intra-prediction mode of the current intra-coded block. For example, when an intra-coded block chooses to inherit the motion information from which neighboring block, the priority of each neighboring block depends on the intra-prediction mode of the current block.

FIG. 10 shows an example of how to inherit motion information based on the intra-prediction mode of the current block. If the intra-prediction mode is DC or Planar, the neighboring blocks priority order is L>T>LT>LB>TR; If the intra-prediction mode is a direction lower than the diagonal direction, the neighboring blocks priority is L>LB>LT>T>TR; If the intra-prediction mode is a direction larger than the diagonal direction, the neighboring blocks priority is T>TR>LT>L>LB.

Figure 11:
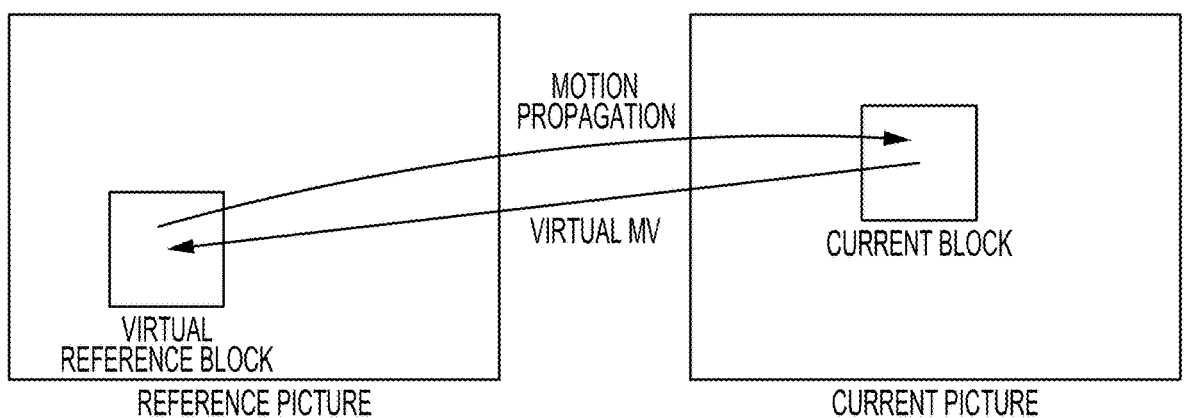
FIG. 11 illustrates an example of inheriting motion information from a temporal neighboring block.

FIG. 11 illustrates an example of inheriting motion information from a temporal neighboring block. The motion information of an intra-coded block can be propagated from a temporal neighboring block. For example, an intra-coded block can inherit motion information from its collocated block in the collocated block. FIG. 11 shows an example of propagating from a temporal neighboring block. A virtual reference block is located with a virtual motion vector in a reference picture. The current block can inherit the motion information from the virtual reference block. The virtual motion vector can be predefined, or it can be inherited from a spatial or temporal neighboring block.

An exemplary method to inherit motion information for an intra-coded block in an inter-picture is described as follows.

First, access the five spatial neighboring blocks: L, T, TR, LB, LT. Check each neighboring block whether it is available. In one example, furthermore, neighboring blocks outside of current slice/tile/LCU rows are defined to be unavailable and won't be used.

Next, classify the available neighboring blocks into two classes: Class 1 and Class 2. A neighboring block is classified into Class 1 if it is inter-coded; Otherwise, i.e. a neighboring block is intra-coded, it is classified into Class 2.

Next, build a priority ordered list (POL) based on the intra-prediction mode of the current block. For example, there are different POL's that may be possible: (i) if the intra-prediction mode is DC or Planar, POL={L, T, LT}; (ii) if the intra-prediction mode is a direction lower than the diagonal direction, POL={L, LB, LT}; and (iii) if the intra-prediction mode is a direction larger than the diagonal direction, POL={T, TR, LT}.

Next, check each neighboring block in POL one by one and find the first that in Class 1. If we can find the first one that in Class 1, then inherit the motion information from that one and stop the algorithm.

Next, check each neighboring block in POL one by one and find the first that in Class 2. If we can find the first one that in Class 2, then inherit the motion information from that one and stop the algorithm.

Next, if, the motion information of the current block is not filled, stuff default motion information. For example, zero motion with reference index=0 to reference list 0 can be the default one. For B-picture, a bi-prediction of zero motion with reference index=0 to reference list 0 and zero motion with reference index=0 to reference list 1 can be the default one.

According to an embodiment, the motion information of an intra-coded block is filled with the motion information of the first candidate of the merge list for the current intra-coded block.

According to an embodiment, the motion propagation can be conducted on sub-blocks level. A sub-block is a M×N block smaller than the current block. For example, sub-block size can be 4×4, 4×8, 8×4 8×8 and so on. The current block consists of X non-overlapped sub-blocks. Motion information can propagate between a block and a sub-block. Also, Motion information can propagate between a sub-block and a sub-block.

According to an embodiment, the inherited motion information in intra-coded blocks can be used in motion vector prediction. For example, it can be used to construct merge candidate list and/or AMVP candidate list for a lately coded block.

Figure 12:
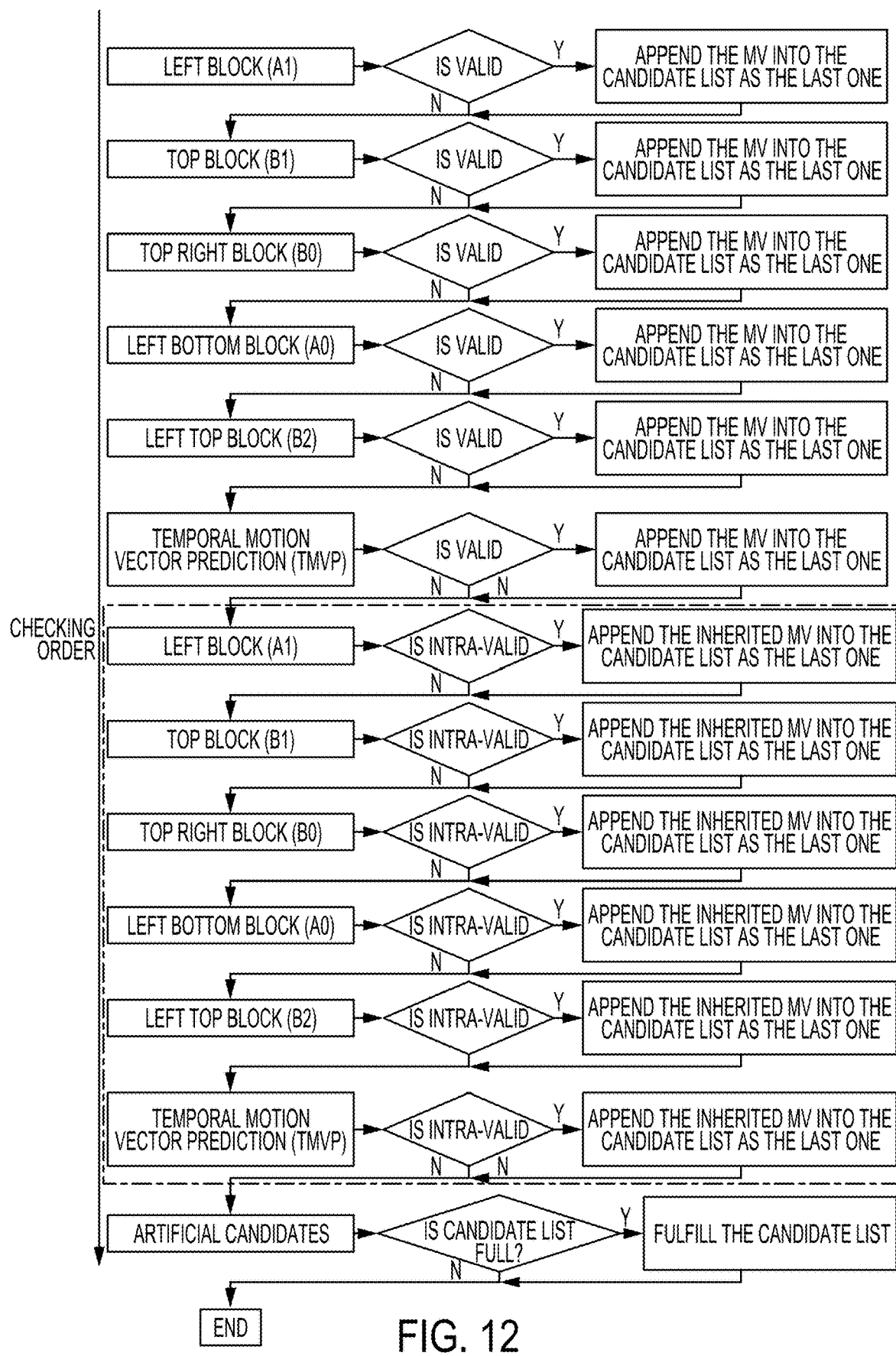
FIG. 12 illustrates an example of building a merge candidate list with inherited motion information.

FIG. 12 illustrates an example of building a merge candidate list with inherited motion information.

According to another example, when building the candidate list, the order of motion information from a spatial or neighboring block inserted into the candidate list may depend on whether it is original information from an inter-coded block, or it is inherited information from an intra-coded block.

Original information (i.e., associated with inter-coded blocks) and inherited motion information (i.e., associated with intra-coded blocks) may have different priority. Motion information with higher priority may be firstly added to the candidate list.

In one example, original information always has higher priority than inherited motion information. FIG. 12 shows an example of building merge candidate list with inherited motion information. The term "intra-valid" means a neighboring block exists, and is intra-coded, and the candidate list of the current block is not full, and the inherited motion information in of the neighboring block is not pruned by existing candidates in the current candidate list. Spatial and temporal neighboring blocks are checked if intra-valid after the normal TMVP candidate. If a neighboring block is intra-valid, the inherited motion information of the neighboring block is appended into the merge candidate list.

Figure 13:
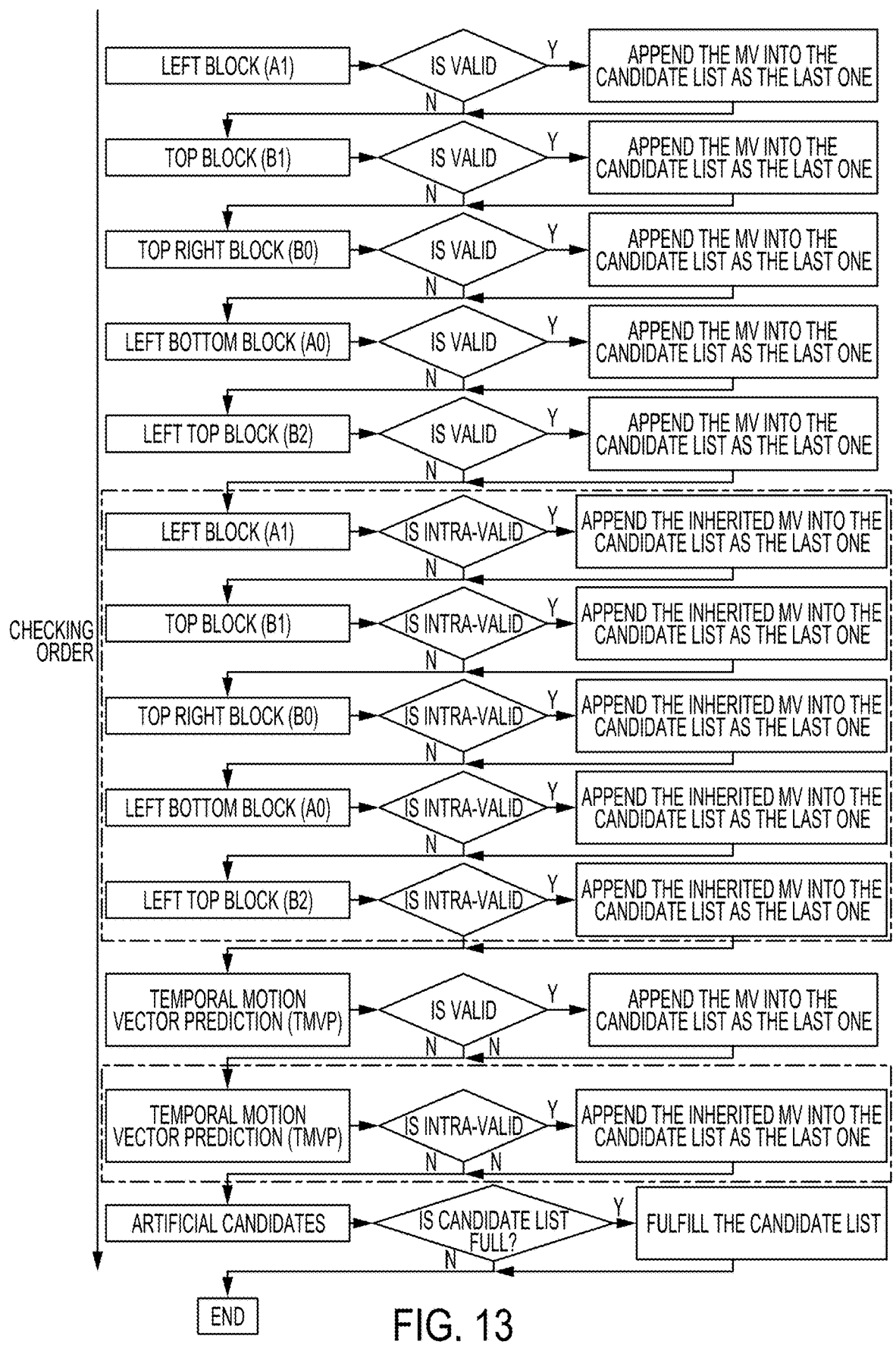
FIG. 13 illustrates another example of building merge candidate list with inherited motion information.

FIG. 13 illustrates another example of building merge candidate list with inherited motion information. In one example, original information associated with spatial neighboring blocks may have higher priority than inherited motion information while inherited motion information may have higher priority than original information associated with temporal neighboring blocks. FIG. 13 shows another example of building merge candidate list with inherited motion information. Spatial neighboring blocks are checked if intra-valid after the normal spatial candidates are checked. The temporal neighboring block is checked if intra-valid after the normal TMVP candidate is checked.

In one example, in addition to considering original or inherited motion information for priority definition, the relative positions of neighboring blocks may be further considered. An example of checking order is: valid A1/B1/B0/A0 blocks, intra-valid A1/B1/B0/A0 blocks, valid B2, intra-valid B2, TMVP.

In one example, inherited motion information may have higher priority than artificial motion information. In another example, inherited motion information may have higher priority than motion information from non-spatial-adjacent and/or non-temporal-adjacent blocks.

According to another example, inherited motion information may be only stored and used for coding current slice/tile/picture. Alternatively, for reference pictures, inherited motion information may also be stored and used.

Figure 14:
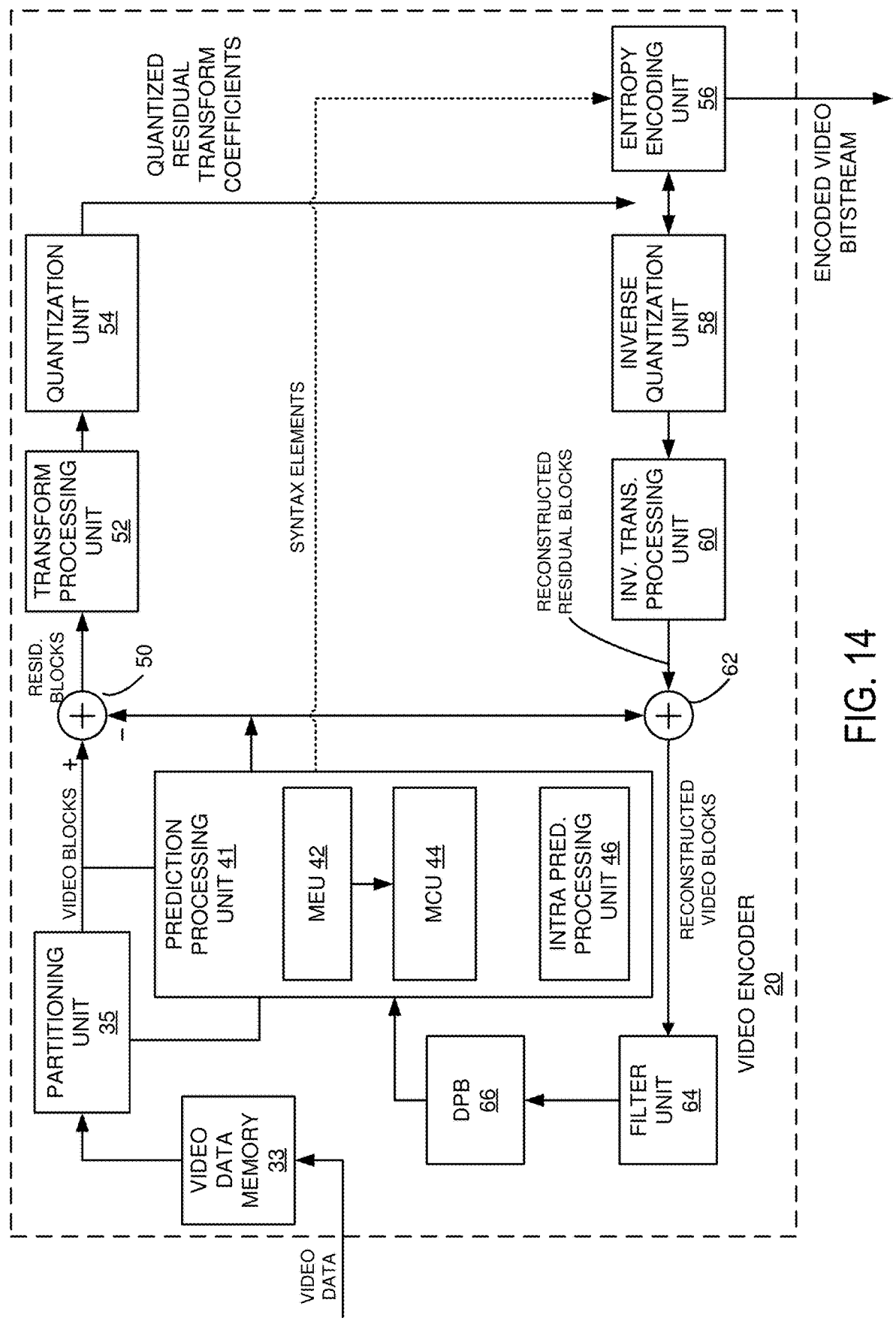
FIG. 14 is a block diagram illustrating an example video encoder 20 that may implement the techniques described in this disclosure.

FIG. 14 is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 14, video encoder 20 includes a video data memory 33, partitioning unit 35, prediction processing unit 41, summer 50, transform processing unit 52, quantization unit 54, entropy encoding unit 56. Prediction processing unit 41 includes motion estimation unit (MEU) 42, motion compensation unit (MCU) 44, and intra prediction unit 46. For video block reconstruction, video encoder 20 also includes inverse quantization unit 58, inverse transform processing unit 60, summer 62, filter unit 64, and decoded picture buffer (DPB) 66.

As shown in FIG. 14, video encoder 20 receives video data and stores the received video data in video data memory 33. Video data memory 33 may store video data to be encoded by the components of video encoder 20. The video data stored in video data memory 33 may be obtained, for example, from video source 18. DPB 66 may be a reference picture memory that stores reference video data for use in encoding video data by video encoder 20, e.g., in intra- or inter-coding modes. Video data memory 33 and DPB 66 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 33 and DPB 66 may be provided by the same memory device or separate memory devices. In various examples, video data memory 33 may be on-chip with other components of video encoder 20, or off-chip relative to those components.

Partitioning unit 35 retrieves the video data from video data memory 33 and partitions the video data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture. The prediction processing unit 41 may be part of a processor which may be configured to generate a first prediction block for a block of a picture according to an intra-prediction mode, and generate a second prediction block for the block of the picture according to an inter-prediction mode. After the first and second prediction blocks are generated, the prediction processing unit 41 may be configured to propagate motion information to the first prediction block based upon motion information from the second prediction block and generate a final prediction block for the block of the picture based on a combination of the first and second prediction blocks. In an example, the first prediction block is used in the construction of a candidate list. The candidate list may be a merging candidate list, or alternatively the candidate list may be an AMVP list.

In an example, the first prediction block and the second prediction block are neighboring blocks. In another example, the first prediction block and the second prediction block are spatially neighboring blocks. In another example, the first prediction block and the second prediction block are temporally neighboring blocks. In another example, the neighboring blocks are within the group of the same: slice, or tile or LCU or ROW or picture. In another example, the neighboring blocks are located in one or more previously coded frames. Moreover, the first prediction block inherits motion information from the second prediction block, and the relative position of the second prediction block with respect to the first prediction block is pre-defined. In addition, the second prediction block is selected from a plurality of neighboring blocks according to a predetermined rule.

Intra prediction unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices or B slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in DPB 66. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture.

The reference picture may be selected from a first reference picture list (List 0) or a second reference picture list (List 1), each of which identify one or more reference pictures stored in DPB 66. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

After prediction processing unit 41 generates the predictive block for the current video block, either via intra prediction or inter prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. In another example, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed block.

Filter unit 64 filters the reconstructed block (e.g. the output of summer 62) and stores the filtered reconstructed block in DPB 66 for uses as a reference block. The reference block may be used by motion estimation unit 42 and motion compensation unit 44 as a reference block to inter-predict a block in a subsequent video frame or picture. Filter unit 64 may perform any type of filtering such as deblock filtering, SAO filtering, ALF, and/or GALF, and/or other types of loop filters. A deblock filter may, for example, apply deblocking filtering to filter block boundaries to remove blockiness artifacts from reconstructed video. An SAO filter may apply offsets to reconstructed pixel values in order to improve overall coding quality. Additional loop filters (in loop or post loop) may also be used.

Figure 15:
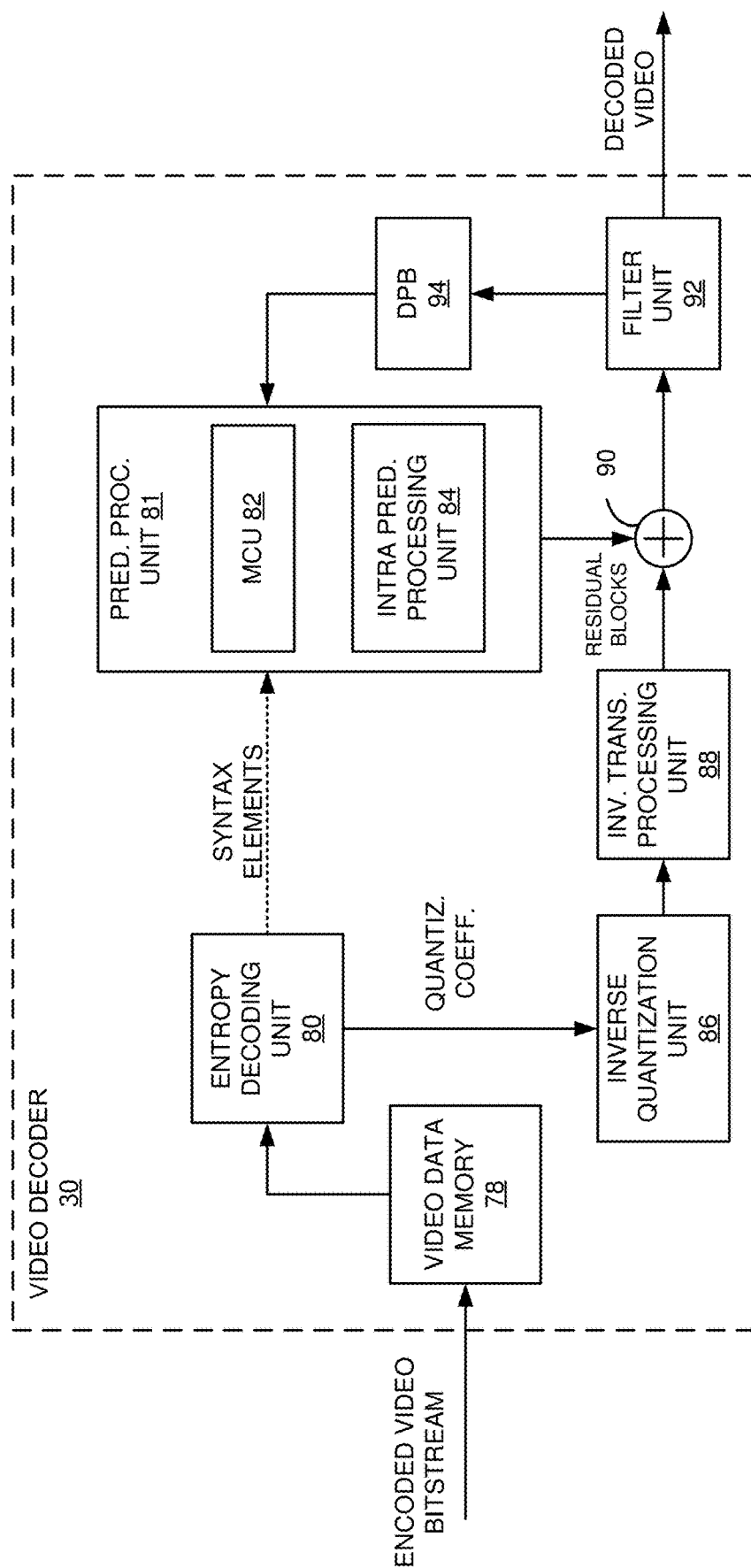
FIG. 15 is a block diagram illustrating an example video decoder 30 that may implement the techniques described in this disclosure.

FIG. 15 is a block diagram illustrating an example video decoder 30 that may implement the techniques described in this disclosure. Video decoder 30 of FIG. 8 may, for example, be configured to receive the signaling described above with respect to video encoder 20 of FIG. 14. In the example of FIG. 15, video decoder 30 includes video data memory 78, entropy decoding unit 80, prediction processing unit 81, inverse quantization unit 86, inverse transform processing unit 88, summer 90, and DPB 94. Prediction processing unit 81 includes motion compensation unit 82 and intra prediction unit 84. Video decoder 30 may, in some examples, perform a decoding pass generally reciprocal to the encoding pass described with respect to video encoder 20 from FIG. 7.

During the decoding process, video decoder 30 receives an encoded video bitstream that represents video blocks of an encoded video slice and associated syntax elements from video encoder 20. Video decoder 30 stores the received encoded video bitstream in video data memory 78. Video data memory 78 may store video data, such as an encoded video bitstream, to be decoded by the components of video decoder 30. The video data stored in video data memory 78 may be obtained, for example, via link 16, from storage device 26, or from a local video source, such as a camera, or by accessing physical data storage media. Video data memory 78 may form a coded picture buffer (CPB) that stores encoded video data from an encoded video bitstream. DPB 94 may be a reference picture memory that stores reference video data for use in decoding video data by video decoder 30, e.g., in intra- or inter-coding modes. Video data memory 78 and DPB 94 may be formed by any of a variety of memory devices, such as DRAM, SDRAM, MRAM, RRAM, or other types of memory devices. Video data memory 78 and DPB 94 may be provided by the same memory device or separate memory devices. In various examples, video data memory 78 may be on-chip with other components of video decoder 30, or off-chip relative to those components.

Entropy decoding unit 80 of video decoder 30 entropy decodes the video data stored in video data memory 78 to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction unit 84 of prediction processing unit 81 may generate prediction data for a video block of the current video slice based on a signaled intra prediction mode and data from previously decoded blocks of the current frame or picture. When the video frame is coded as an inter-coded slice (e.g., B slice or P slice), motion compensation unit 82 of prediction processing unit 81 produces the final generated predictive blocks for a video block of the current video slice based on the motion vectors and other syntax elements received from entropy decoding unit 80. The final generated predictive blocks may be produced from one of the reference pictures within one of the reference picture lists. The prediction processing unit 81 may be part of a processor which may be configured to reconstruct a first prediction block for a block of a picture according to an intra-prediction mode, and reconstruct a second prediction block for the block of the picture according to an inter-prediction mode. After the first and second prediction blocks are generated, the prediction processing unit 81 may be configured to propagate motion information to the first generated prediction block based upon motion information from the generated second prediction block and generate a final generated prediction block for the block of the picture based on a combination of the first and second prediction blocks. In an example, the first generated prediction block is used in the construction of a candidate list. The candidate list may be a merging candidate list, or alternatively the candidate list may be an AMVP list.

In an example, the first prediction block and the second prediction block are neighboring blocks. In another example, the first prediction block and the second prediction block are spatially neighboring blocks. In another example, the first prediction block and the second prediction block are temporally neighboring blocks. In another example, the neighboring blocks are within the group of the same: slice, or tile or LCU or ROW or picture. In another example, the neighboring blocks are located in one or more previously coded frames. Moreover, the first prediction block inherits motion information from the second prediction block, and the relative position of the second prediction block with respect to the first prediction block is pre-defined. In addition, the second prediction block is selected from a plurality of neighboring blocks according to a predetermined rule.

Video decoder 30 may construct the reference frame lists, List 0 and List 1, using default construction techniques based on reference pictures stored in DPB 94.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After prediction processing unit generates the predictive block for the current video block using, for example, intra or inter prediction, video decoder 30 forms a reconstructed video block by summing the residual blocks from inverse transform processing unit 88 with the corresponding predictive blocks generated by motion compensation unit 82. Summer 90 represents the component or components that perform this summation operation.

Filter unit 92 filters the reconstructed block (e.g. the output of summer 90) and stores the filtered reconstructed block in DPB 94 for uses as a reference block. The reference block may be used by motion compensation unit 82 as a reference block to inter-predict a block in a subsequent video frame or picture. Filter unit 92 may perform any type of filtering such as deblock filtering, SAO filtering, ALF, and/or GALF, and/or other types of loop filters. A deblock filter may, for example, apply deblocking filtering to filter block boundaries to remove blockiness artifacts from reconstructed video. An SAO filter may apply offsets to reconstructed pixel values in order to improve overall coding quality. Additional loop filters (in loop or post loop) may also be used.

Figure 16:
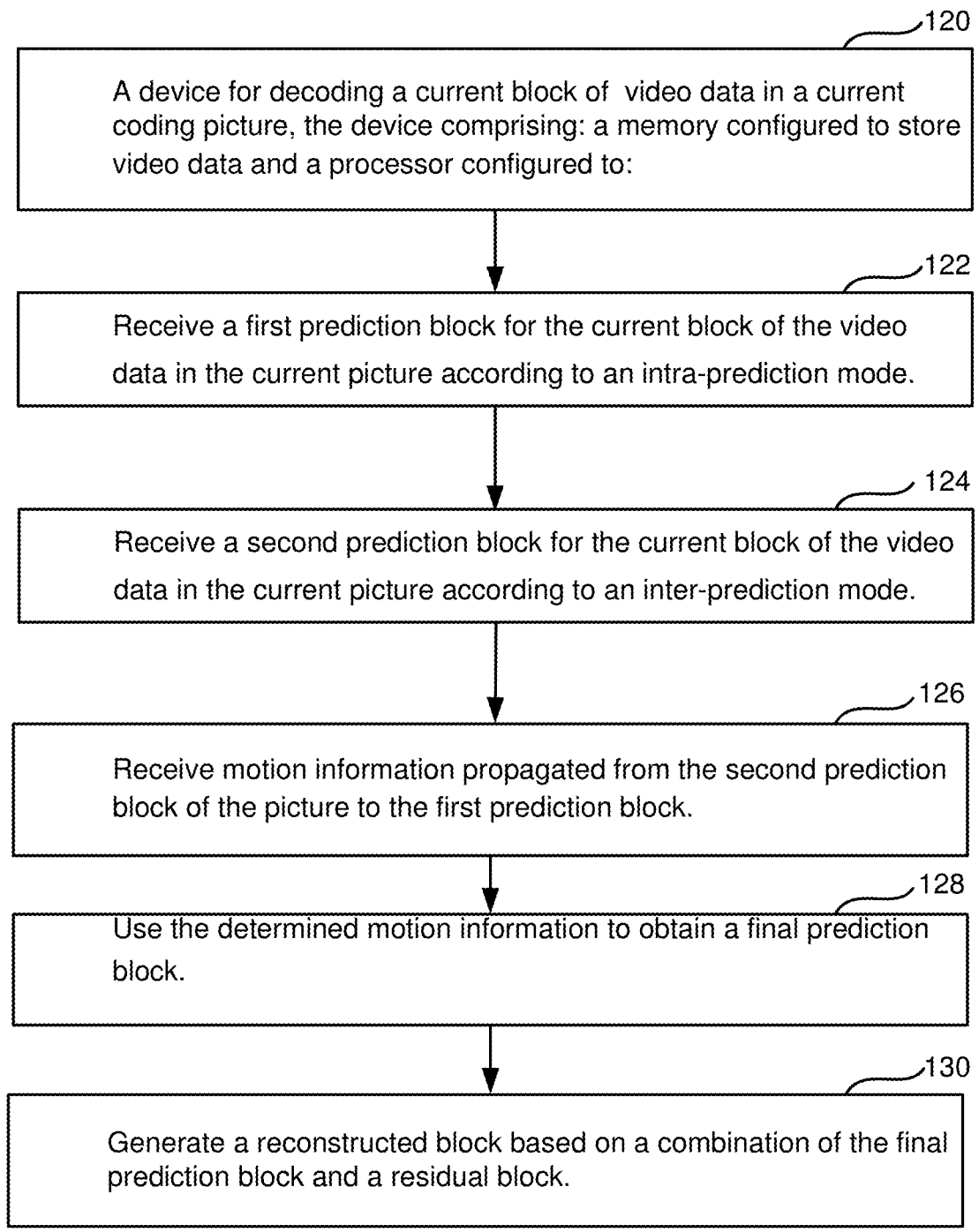
FIG. 16 is a flow diagram illustrating an example video decoding process in accordance with the techniques of this disclosure.

FIG. 16 is a flow diagram illustrating an example video decoding process in accordance with the techniques of this disclosure. As illustrated in FIG. 16, a device for decoding a current block of video data in a current coding picture, the device comprising: a memory configured to store video data and a processor configured to: 120 generate a first prediction block for the current block of the video data in the current picture according to an intra-prediction mode 122. The processor may be configured to generate a second prediction block for the current block of the video data in the current picture the picture according to an inter-prediction mode 124. In addition, the processor may be configured to generate motion information propagated from the second prediction block of the picture to the first prediction block 126. Moreover, the processor may be configured to use the determined motion information to obtain a final prediction block; 128 and generate a reconstructed block based on a combination of the final prediction block and a residual block 130.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

The coding techniques discussed herein may be embodiment in an example video encoding and decoding system. A system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and an output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device.

Various examples have been described. These and other examples are within the scope of the following claims.

What is claimed is:

1. A device for decoding a current intra-coded block of video data in a current coding picture, the device comprising:
    a memory configured to store the video data; and
    a processor configured to:
        generate motion information for the current intra-coded block of video data based on a propagation of motion information from neighboring blocks of the current intra-coded block;
        determine if the neighboring blocks are intra-coded or inter-coded; and
        inherit motion information, from the neighboring blocks which are inter-coded, with a higher priority over inheriting information from the neighboring blocks which are intra-coded.

2. The device of claim 1, wherein the processor is further configured to construct a candidate list for decoding of a future inter-coded block based on the inherited motion information from the neighboring inter-coded blocks of the current intra-coded block.

3. The device of claim 2, wherein the candidate list is a merge candidate list.

4. The device of claim 2, wherein the candidate list is an advanced motion vector prediction list.

5. The device of claim 1, wherein the current intra-coded block and the future inter-coded block are neighboring blocks.

6. The device of claim 5, wherein the current intra-coded block and the future inter-coded block are spatially neighboring blocks.

7. The device of claim 5, wherein the first prediction current intra-coded block and the future inter-coded block are temporally neighboring blocks.

8. The device of claim 5, wherein the first intra-coded block and the future inter-coded block are neighboring blocks within the group of the same: slice or tile or LCU or ROW or picture.

9. The device of claim 5, wherein the neighboring blocks are located in one or more previously coded frames.

10. The device of claim 1, wherein the relative position of the future inter-coded block with respect to the current-intra-coded block is pre-defined.

11. The device of claim 1, wherein the motion information propagated is conducted on a sub-block level.

12. A method of processing a current intra-coded block of video data of a picture, comprising:
    generating motion information for the current intra-coded block of video data based on propagating motion information from neighboring blocks of the current intra-coded block;
    determining if the neighboring blocks are intra-coded or inter-coded; and
    inheriting motion information, from the neighboring blocks which are inter-coded, with a higher priority over inheriting information from the neighboring blocks which are intra-coded.

13. The method according to claim 12, further comprising constructing a candidate list for decoding of a future inter-coded block based on the inherited motion information from the neighboring inter-coded blocks of the current intra-coded block.

14. The method according to claim 13, wherein the candidate list is a merge candidate list.

15. The method according to claim 13, wherein the candidate list is an advanced motion vector prediction list.

16. The method according to claim 13, wherein the current intra-coded is a neighboring block of the future inter-coded block.

17. The method according to claim 16, wherein the current intra-coded block and the future inter-coded block are spatially neighboring blocks.

18. The method according to claim 16, wherein the current intra-coded block and the future inter-coded block are temporally neighboring blocks.

19. The method according to claim 16, wherein the current intra-coded block and the future inter-coded block are neighboring blocks within the group of the same: slice, or tile or LCU or ROW or picture.

20. The method according to claim 16, wherein the neighboring blocks are located in one or more previously coded frames.

21. The method according to claim 13, wherein the relative position of the future inter-coded block with respect to the current intra-coded block is pre-defined.

22. The method according to claim 12, wherein the motion information propagated is conducted on a sub-block level.

23. The method according to claim 12, wherein the propagating of the motion information is performed after encoding a previous block.

24. The method according to claim 12, wherein the propagating of the motion information is performed after decoding a previous block.

25. A device for encoding a current block of video data in a current coding picture, the device comprising:
   a memory configured to store the video data; and
   a processor configured to:
      generate motion information for the current intra-coded block of video data based on a propagation of motion information from neighboring blocks of the current intra-coded block;
      determine if the neighboring blocks are intra-coded or inter-coded; and
      inherit motion information, from the neighboring blocks which are inter-coded, with a higher priority over inheriting information from the neighboring blocks which are intra-coded.

26. The device of claim 25, wherein the processor is further configured to construct a candidate list for decoding of a future inter-coded block based on the inherited motion information from the neighboring inter-coded blocks of the current intra-coded block.

27. The device of claim 25, wherein the candidate list an advanced motion vector prediction list or a merge candidate list.

28. A non-transitory computer readable medium having stored thereon instructions that when executed by a processor perform:
   generate motion information for the current intra-coded block of video data based on a propagation of motion information from neighboring blocks of the current intra-coded block;
   determine if the neighboring blocks are intra-coded or inter-coded; and
   inherit motion information, from the neighboring blocks which are inter-coded, with a higher priority over inheriting information from the neighboring blocks which are intra-coded.

* * * * *